United States Patent
Deguchi et al.

(10) Patent No.: US 12,435,219 B2
(45) Date of Patent: Oct. 7, 2025

(54) CURABLE RESIN COMPOSITION, CURED OBJECT, AND THREE-DIMENSIONAL OBJECT

(71) Applicant: DIC Corporation, Tokyo (JP)

(72) Inventors: Yoshinobu Deguchi, Chiba (JP); Narumon Thimthong, Chiba (JP)

(73) Assignee: DIC Corporation, Tokyo (JP)

( * ) Notice: Subject to any disclaimer, the term of this patent is extended or adjusted under 35 U.S.C. 154(b) by 574 days.

(21) Appl. No.: 17/786,533

(22) PCT Filed: Dec. 10, 2020

(86) PCT No.: PCT/JP2020/045956
§ 371 (c)(1),
(2) Date: Jun. 17, 2022

(87) PCT Pub. No.: WO2021/125024
PCT Pub. Date: Jun. 24, 2021

(65) Prior Publication Data
US 2023/0056941 A1    Feb. 23, 2023

(30) Foreign Application Priority Data

Dec. 19, 2019 (JP) .................... 2019-229181

(51) Int. Cl.
| | | |
|---|---|---|
| C08L 75/06 | (2006.01) |
| B29C 64/112 | (2017.01) |
| B29C 64/124 | (2017.01) |
| B33Y 10/00 | (2015.01) |
| B33Y 70/00 | (2020.01) |
| B33Y 80/00 | (2015.01) |
| C08F 2/48 | (2006.01) |
| C08F 220/18 | (2006.01) |
| C08F 222/10 | (2006.01) |
| C08F 290/06 | (2006.01) |
| C08G 18/24 | (2006.01) |
| C08G 18/42 | (2006.01) |
| C08G 18/66 | (2006.01) |
| C08G 18/67 | (2006.01) |
| C08G 18/75 | (2006.01) |
| C08G 63/16 | (2006.01) |

(52) U.S. Cl.
CPC ............ *C08L 75/06* (2013.01); *B29C 64/112* (2017.08); *B29C 64/124* (2017.08); *B33Y 10/00* (2014.12); *B33Y 70/00* (2014.12); *B33Y 80/00* (2014.12); *C08F 2/48* (2013.01); *C08F 220/18* (2013.01); *C08F 222/10* (2013.01); *C08F 222/1065* (2020.02); *C08F 290/067* (2013.01); *C08G 18/246* (2013.01); *C08G 18/42* (2013.01); *C08G 18/4238* (2013.01); *C08G 18/6625* (2013.01); *C08G 18/672* (2013.01); *C08G 18/755* (2013.01); *C08G 63/16* (2013.01)

(58) Field of Classification Search
CPC ......... C08L 75/06; B33Y 10/00; B33Y 70/00; B33Y 80/00; C08G 18/246; C08G 18/4238; C08G 18/672; C08G 63/16; C08G 18/755; C08G 18/42; C08G 18/6625; C08F 2/48; C08F 222/1065; C08F 290/067; C08F 220/18; C08F 222/10; B29C 64/112; B29C 64/124
See application file for complete search history.

(56) References Cited

U.S. PATENT DOCUMENTS

| | | |
|---|---|---|
| 5,178,952 A | 1/1993 | Yamamoto et al. |
| 2005/0239916 A1 | 10/2005 | Day et al. |
| 2021/0024682 A1 | 1/2021 | Suzuki |
| 2021/0340304 A1 | 11/2021 | Ito et al. |
| 2022/0041777 A1 | 2/2022 | Ito et al. |

FOREIGN PATENT DOCUMENTS

| | | |
|---|---|---|
| JP | H07228644 | 8/1995 |
| JP | 2000086302 | 3/2000 |
| JP | 2008189782 | 8/2008 |
| JP | 2019199448 | 11/2019 |
| WO | 2019189566 | 10/2019 |
| WO | 2020071552 | 4/2020 |
| WO | 2020129736 | 6/2020 |
| WO | 2020234775 | 11/2020 |

OTHER PUBLICATIONS

"International Search Report (Form PCT/ISA/210) of PCT/JP2020/045956," mailed on Mar. 2, 2021, with English translation thereof, pp. 1-5.

*Primary Examiner* — Rabon A Sergent
(74) *Attorney, Agent, or Firm* — JCIPRNET

(57) ABSTRACT

A curable resin composition that has low viscosity and forms a cured product having excellent mechanical physical properties, a cured product, and a three-dimensional object. The curable resin composition contains a urethane resin (A) containing a (meth)acryloyl group, and a monofunctional (meth)acrylate compound (B1) and/or a bifunctional (meth)acrylate compound (B2), in which the urethane resin (A) is formed using, as essential reaction raw materials, a polyester polyol (a1), a polyisocyanate (a2), and a compound (a3) containing a hydroxyl group and a (meth)acryloyl group, and the polyester polyol (a1) is formed using, as essential reaction raw materials, a glycol (a1-1) containing a hydrocarbon group in a side chain, and a polycarboxylic acid (a1-2).

9 Claims, No Drawings

CURABLE RESIN COMPOSITION, CURED OBJECT, AND THREE-DIMENSIONAL OBJECT

CROSS-REFERENCE TO RELATED APPLICATION

This application is a 371 application of the international PCT application serial no. PCT/JP2020/045956, filed on Dec. 10, 2020, which claims the priority benefit of Japan application no. 2019-229181, filed on Dec. 19, 2019. The entirety of each of the above-mentioned patent applications is hereby incorporated by reference herein and made a part of this specification.

TECHNICAL FIELD

The present invention relates to a curable resin composition, a cured product, and a three-dimensional object.

BACKGROUND ART

In recent years, as a method for producing resin molded articles, a three-dimensional optical modeling method (stereolithography) has been used in which a curable resin composition is selectively polymerized and cured by an active energy ray such as an ultraviolet laser to produce a three-dimensional object according to three-dimensional shape data designed with a three-dimensional design system such as three-dimensional CAD. The three-dimensional optical modeling method can cope with complicated shapes that are difficult to cut, shortens the production time, and is easy to handle, and therefore, the three-dimensional optical modeling method can be widely used in the production of prototype models of industrial products in addition to the resin molded articles.

Typical examples of the three-dimensional optical modeling method include a method in which a liquid photocurable resin placed in a container is irradiated from above with a computer-controlled spot ultraviolet laser to cure one layer with a predetermined thickness, a liquid resin is applied onto the layer by lowering the object by one layer and is irradiated and cured with the ultraviolet laser in the same manner as described above to form a laminate, and the operations are repeated to obtain a three-dimensional object. Moreover, recently, besides the above-described spot beam lithography method using the spot ultraviolet laser, a planar exposure method is present more in which a light source other than the laser, such as an LED, is used to radiate, via a planar lithography mask called digital micromirror device (DMD) in which a plurality of digital micromirror shutters are arranged in a plane, an ultraviolet light beam from below through a transparent container containing a photocurable resin to cure one layer with a pattern having a predetermined cross-sectional shape, followed by pulling up the object by one layer, the next layer is irradiated and cured in the same manner as described above, and layers are sequentially laminated to obtain a three-dimensional object.

Examples of required characteristics of the photocurable resin used in the three-dimensional optical modeling methods include various characteristics such as low viscosity, ability to form a smooth liquid surface, and excellent curability. As such a photocurable resin, a resin composition mainly containing a radically polymerizable compound is known (see, for example, PTLs 1 and 2), but the resin composition does not satisfy the ever-increasing demands for elastic modulus, elongation, and impact resistance.

Thus, a material that has low viscosity and can form a cured product having excellent mechanical physical properties is desirable.

CITATION LIST

Patent Literature

PTL 1: JP-A-H07-228644
PTL 2: JP-A-2008-189782

SUMMARY OF INVENTION

Technical Problem

The invention provides a curable resin composition that has low viscosity and forms a cured product having excellent mechanical physical properties, a cured product, and a three-dimensional object.

Solution to Problem

As a result of diligent studies to solve the above problems, the inventors have found that the above problems can be solved by using a curable resin composition containing a specific urethane resin and a specific acrylate compound, and have completed the invention.

That is, the invention relates to a curable resin composition, a cured product, and a three-dimensional object, and the curable resin composition contains a urethane resin (A) containing a (meth)acryloyl group, and a monofunctional (meth)acrylate compound (B1) and/or a bifunctional (meth)acrylate compound (B2), in which the urethane resin (A) is formed using, as essential reaction raw materials, a polyester polyol (a1), a polyisocyanate (a2), and a compound (a3) containing a hydroxyl group and a (meth)acryloyl group, and the polyester polyol (a1) is formed using, as essential reaction raw materials, a glycol (a1-1) containing a hydrocarbon group in a side chain, and a polycarboxylic acid (a1-2).

Advantageous Effects of Invention

Since the curable resin composition of the invention has low viscosity and can form a cured product having excellent mechanical physical properties, the curable resin composition can be preferably used as a resin composition for three-dimensional optical modeling. It should be noted that the "excellent mechanical physical properties" as mentioned in the invention means that the "elastic modulus" and the "impact resistance" are excellent.

DESCRIPTION OF EMBODIMENTS

The curable resin composition of the invention contains a urethane resin (A) containing a (meth)acryloyl group and a monofunctional (meth)acrylate compound (B1) and/or a bifunctional (meth)acrylate compound (B2).

It should be noted that, in the invention, the term "(meth)acrylate" means acrylate and/or methacrylate. Moreover, the term "(meth)acryloyl" means acryloyl and/or methacryloyl. Furthermore, the "(meth)acrylic" means acrylic and/or methacrylic.

The urethane resin (A) has the (meth)acryloyl group as an essential component.

The urethane resin (A) is formed using, as essential reaction raw materials, a polyester polyol (a1), a polyisocyanate (a2), and a compound (a3) containing a hydroxyl group and a (meth)acryloyl group, and the polyester polyol (a1) is formed using, as essential reaction raw materials, a glycol (a1-1) containing a hydrocarbon group in a side chain and a polycarboxylic acid (a1-2).

The polyester polyol (a1) is formed using the glycol (a1-1) containing the hydrocarbon group in the side chain and the polycarboxylic acid (a1-2) as essential reaction raw materials, as described above.

The glycol (a1-1) containing the hydrocarbon group in the side chain is not particularly limited in the number of branched chains and the molecular weight, and may be any compound. Specifically, the glycol (a1-1) may be 2-methyl-1,3-propanediol, neopentyl glycol, 2-ethyl-1,3-propanediol, 2-methyl-1,4-butanediol, 2-ethyl-2-methyl-1,3-propanediol, 2-ethylbutane-1,4-butanediol, 2,3-dimethyl-1,4-butanediol, 3-methyl-1,5-pentanediol, 2,4-dimethyl-1,5-pentanediol, 3,3-dimethylpentane-1,5-diol, 2,2-diethyl-1,3-propanediol, 3-propylpentane-1,5-diol, 2,2-diethyl-1,4-butanediol, 2,4-diethyl-1,5-pentanediol, 2,2-dipropyl-1,3-propanediol, 2-ethyl-2-butyl-1,3-propanediol, 2,5-diethyl-1,6-hexanediol, and the like. The glycols (a1-1) containing the hydrocarbon group in the side chain in the molecular structures may be used alone or in combination of two or more kinds thereof. Among these, 3-methyl-1,5-pentanediol is preferable because a curable resin composition that has low viscosity and can form a cured product having excellent mechanical physical properties can be obtained.

Examples of the polycarboxylic acid (a1-2) include: aliphatic polycarboxylic acids such as succinic acid, adipic acid, azelaic acid, sebacic acid, glutaric acid, pimelic acid, suberic acid, dodecane dicarboxylic acid, maleic acid, and fumaric acid; alicyclic polycarboxylic acids such as 1,3-cyclopentanedicarboxylic acid, 1,2-cyclohexanedicarboxylic acid, 1,3-cyclohexanedicarboxylic acid, and 1,4-cyclohexanedicarboxylic acid; and aromatic polycarboxylic acids such as orthophthalic acid, isophthalic acid, terephthalic acid, naphthalenedicarboxylic acid, biphenyldicarboxylic acid, and 1,2-bis(phenoxy)ethane-p,p'-dicarboxylic acid. These polycarboxylic acids may be used alone or in combination of two or more kinds thereof. Further, among these, the aliphatic polycarboxylic acids are preferable because a curable resin composition that has low viscosity and can form a cured product having excellent mechanical physical properties can be obtained.

The number average molecular weight (Mn) of the polyester polyol (a1) is preferably in a range of 1,000 to 10,000, and more preferably in a range of 1,500 to 8,000 because a curable resin composition that has low viscosity and can form a cured product having excellent mechanical physical properties can be obtained. Further, in the invention, the "number average molecular weight (Mn)" is a value measured using the gel permeation chromatography (GPC).

The production method for the polyester polyol (a1) is not particularly limited, and any method may be used for producing the polyester polyol (a1). For example, a method can be used in which the glycol (a1-1) containing the hydrocarbon group in the side chain and the polycarboxylic acid (a1-2) are subjected to a dehydration condensation reaction in a temperature range of 200° C. to 280° C. until the acid value becomes 5 mg/KOH or less to obtain the polyester polyol (a1).

Examples of the polyisocyanate (a2) include: aliphatic diisocyanate compounds such as butane diisocyanate, hexamethylene diisocyanate, 2,2,4-trimethylhexamethylene diisocyanate, and 2,4,4-trimethylhexamethylene diisocyanate; alicyclic diisocyanate compounds such as norbornane diisocyanate, isophorone diisocyanate, hydrogenated xylylene diisocyanate, and hydrogenated diphenylmethane diisocyanate; aromatic diisocyanate compounds such as tolylene diisocyanate, xylylene diisocyanate, tetramethylxylylene diisocyanate, diphenylmethane diisocyanate, 1,5-naphthalene diisocyanate, 4,4'-diisocyanato-3,3'-dimethylbiphenyl, and o-trizine diisocyanate; or polymethylene polyphenyl polyisocyanates containing a repeating structure represented by the following structural formula (1); isocyanurate-modified products, biuret-modified products, and allophanate-modified products of these compounds; and the like. Moreover, these polyisocyanates may be used alone or in combination of two or more kinds thereof.

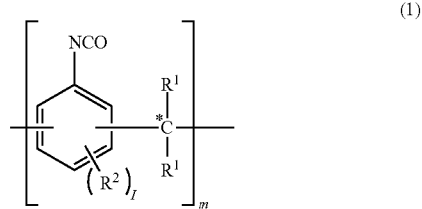

(1)

[In the formula, $R^1$ each independently represent a hydrogen atom or a hydrocarbon group having 1 to 6 carbon atoms. $R^2$ each independently represent an alkyl group having 1 to 4 carbon atoms or a bond point linked to a structural moiety represented by the structural formula (1) via a methylene group marked with * mark. 1 represents an integer of 0 or 1 to 3, and m represents an integer of 1 to 15.]

Examples of the compound (a3) including a hydroxyl group and a (meth)acryloyl group include hydroxyethyl (meth)acrylate, hydroxypropyl (meth)acrylate, trimethylolpropane (meth)acrylate, trimethylolpropane di(meth)acrylate, pentaerythritol (meth)acrylate, pentaerythritol di(meth)acrylate, pentaerythritol tri(meth)acrylate, dipentaerythritol (meth)acrylate, dipentaerythritol di(meth)acrylate, dipentaerythritol tri(meth)acrylate, dipentaerythritol tetra(meth)acrylate, dipentaerythritol penta(meth)acrylate, ditrimethylolpropane (meth)acrylate, ditrimethylolpropane di(meth)acrylate, ditrimethylolpropane tri(meth)acrylate, and the like. Further, a (poly)oxyalkylene-modified product obtained by introducing (poly)oxyalkylene chains such as a (poly)oxyethylene chain, a (poly)oxypropylene chain, or a (poly)oxytetramethylene chain into the molecular structure of various compounds containing a hydroxyl group and a (meth)acryloyl group, a lactone-modified product obtained by introducing a (poly)lactone structure into the molecular structure of various compounds containing a hydroxyl group and a (meth)acryloyl group, or the like may also be used. These compounds containing a hydroxyl group and a (meth)acryloyl group may be used alone or in combination of two or more kinds thereof.

The content of the urethane resin (A) is preferably in a range of 3% by mass to 50% by mass, and more preferably in a range of 20% by mass to 40% by mass in the solid content of the curable resin composition of the invention because a curable resin composition that has low viscosity and can form a cured product having excellent mechanical physical properties can be obtained.

The production method for the urethane resin (A) is not particularly limited, and any method may be used for producing the urethane resin (A). For example, the urethane resin (A) may be produced by a method for collectively reacting all of the reaction raw materials containing the polyester polyol (a1), the polyisocyanate (a2), and the compound (a3) containing a hydroxyl group and a (meth)acryloyl group, or may be produced by a method for sequentially reacting the reaction raw materials. Moreover, the equivalent ratio (OH/NCO) of the total of the hydroxyl groups (OH) contained in the polyester polyol (a1) and the compound (a3) containing a hydroxyl group and a (meth)acryloyl group to the isocyanate group (NCO) contained in polyisocyanate (a2) is preferably in a range of 0.9/1 to 1/0.9 and more preferably 1/1 because a curable resin composition that has low viscosity and can form a cured product having excellent mechanical physical properties can be obtained.

In the production of the urethane resin (A), for example, dibutyltin dilaurate, dibutyltin acetate and the like may be used as a catalyst, and the urethane resin (A) may be produced under the conditions for a normal urethanization reaction. In addition, if necessary, a solvent such as ethyl acetate, butyl acetate, methyl isobutyl ketone, toluene, and xylene may be used, or a radically polymerizable monomer that does not contain a hydroxyl group or an amino group in radically polymerizable monomers that do not contain a moiety that reacts with the isocyanate may also be used as the solvent.

Examples of the monofunctional (meth)acrylate compound (B1) include phenoxyethyl (meth)acrylate, phenoxybenzyl (meth)acrylate, cyclohexyl (meth)acrylate, trimethylcyclohexyl (meth)acrylate, cyclohexylmethyl (meth)acrylate, ethylcyclohexyl (meth)acrylate, 2-ethylhexyl (meth)acrylate, dipropylene glycol mono(meth)acrylate, isobornyl (meth)acrylate, norbornyl (meth)acrylate, isononyl (meth)acrylate, benzyl (meth)acrylate, phenylbenzyl (meth)acrylate, lauryl (meth)acrylate, tetrahydrofurfuryl (meth)acrylate, ethoxyethoxyethyl (meth)acrylate, 2-(meth)acryloyloxy ethyl succinate, methyl (meth)acrylate, ethyl (meth)acrylate, n-butyl (meth)acrylate, n-pentyl (meth)acrylate, n-hexyl (meth)acrylate, isobutyl (meth)acrylate, tert-butyl (meth)acrylate, n-octyl (meth)acrylate, isooctyl (meth)acrylate, 2-ethylmethoxy (meth)acrylate, 2-ethylethoxy (meth)acrylate, 2-ethylbutoxy (meth)acrylate, n-decyl (meth)acrylate, isodecyl (meth)acrylate, butoxydiethylene glycol (meth)acrylate, butoxytriethylene glycol (meth)acrylate, methoxydiethylene glycol (meth)acrylate, methoxytriethylene glycol (meth)acrylate, methoxypolyethylene glycol (meth)acrylate, 2-hydroxyethyl (meth)acrylate, 2-hydroxypropyl (meth)acrylate, 4-hydroxybutyl (meth)acrylate, dimethylaminoethyl (meth)acrylate, diethylaminoethyl (meth)acrylate, (meth)acryloyl morpholine 2-(meth)acryloyloxyethyl succinic acid, 2-(meth)acryloyloxyethyl hexahydrophthalic acid, glycidyl (meth)acrylate, 2-hydroxy-3-phenoxypropyl (meth)acrylate, dicyclopentenyl (meth)acrylate, dicyclopentenyloxyethyl (meth)acrylate, dicyclopentanyl (meth)acrylate, dicyclopentanyloxyethyl (meth)acrylate, pentamethylpiperidinyl (meth)acrylate, tetramethylpiperidinyl (meth)acrylate, (2-methyl-2-ethyl-1,3-dioxolane-4-yl) methyl (meth)acrylate, 3,4-epoxycyclohexylmethylmethacrylate, cyclic trimethylolpropane formal (meth)acrylate, 1-adamantyl (meth)acrylate, 2-adamantyl (meth)acrylate, 2-methyl-2-adamantyl (meth)acrylate, and the like. These monofunctional (meth)acrylate compounds may be used alone or in combination of two or more kinds thereof. Further, among these, a monofunctional (meth)acrylate compound whose polymer has a glass transition temperature (hereinafter abbreviated as "Tg") of 80° C. or higher is preferable because a curable resin composition that has low viscosity and can form a cured product having excellent mechanical physical properties can be obtained. Among these compounds, a (meth)acrylate compound containing a cyclic structure such as a condensed polycyclic structure or a heterocyclic structure is preferable, and acryloyl morpholine (Tg: 145° C.), isobornyl acrylate (Tg: 94° C.), isobornyl methacrylate (Tg: 180° C.), dicyclopentenyl acrylate (Tg: 120° C.), dicyclopentanyl acrylate (Tg: 120° C.), and dicyclopentanyl methacrylate (Tg: 175° C.) are more preferable, and acryloyl morpholine is particularly preferable.

Further, in a case where two or more kinds of the monofunctional (meth)acrylate compounds (B1) are used in combination, it is preferable that the Tg of a copolymer of two or more kinds of the monofunctional (meth)acrylate compounds is 80° C. or higher.

Examples of the bifunctional (meth)acrylate compound (B2) include 1,6-hexanediol di(meth)acrylate, 1,4-butanediol di(meth)acrylate, 1,3-butylene glycol di(meth)acrylate, 1,9-nonanediol di(meth)acrylate, 1,10-decanediol di(meth)acrylate, neopentyl glycol di(meth)acrylate, ethylene oxide-modified 1,6-hexanediol di(meth)acrylate, neopentyl glycol di(meth)acrylate hydroxypivalate, propylene oxide-modified neopentyl glycol di(meth)acrylate, tripropylene glycol di(meth)acrylate, dipropylene glycol di(meth)acrylate, triethylene glycol di(meth)acrylate, ethylene oxide-modified di(meth)acrylate of bisphenol A, propylene oxide-modified di(meth)acrylate of bisphenol A, ethylene oxide-modified di(meth)acrylate of bisphenol F, tricyclodecane dimethanol di(meth)acrylate, tetraethylene glycol di(meth)acrylate, polyethylene glycol di(meth)acrylate, polypropylene glycol di(meth)acrylate, propylene oxide-modified tri(meth)acrylate of glycerin, 2-hydroxy-3-acryloyloxypropyl (meth)acrylate, ethylene oxide-modified di(meth)acrylate of bisphenoxyethanol fluorene, polytetramethylene glycol di(meth)acrylate, ethoxylated isocyanuric acid tri(meth)acrylate, phenoxyethylene glycol (meth)acrylate, stearyl (meth)acrylate, 2-(meth)acryloyloxyethyl succinate, trifluoroethyl (meth)acrylate 3-methyl-1,5-pentanediol di(meth)acrylate, 2,3-[(meth)acryloyloxymethyl] norbornane, 2,5-[(meth)acryloyloxymethyl] norbornane, 2,6-[(meth)acryloyloxymethyl] norbornane, 1,3-adamantyl di(meth)acrylate, 1,3-bis[(meth)acryloyloxymethyl]adamantane, tris(hydroxyethyl)isocyanuric acid di(meth)acrylate, 3,9-bis[1,1-dimethyl-2-(meth)acryloyloxyethyl]-2,4,8,10-tetraoxospiro[5.5]undecane, and the like. These bifunctional (meth)acrylate compounds may be used alone or in combination of two or more kinds thereof. Further, among these, a bifunctional (meth)acrylate compound whose polymer has a Tg of 80° C. or higher is preferable because a curable resin composition that has low viscosity and can form a cured product having excellent mechanical physical properties can be obtained. Among these compounds, dipropylene glycol diacrylate (Tg: 102° C.) and tricyclodecane dimethanol diacrylate (Tg: 110° C.) are more preferable.

Further, in a case where two or more kinds of the bifunctional (meth)acrylate compounds (B2) are used in combination, it is preferable that the Tg of a copolymer of two or more kinds of the bifunctional (meth)acrylate compounds is 80° C. or higher.

Moreover, the monofunctional (meth)acrylate compound (B1) and the bifunctional (meth)acrylate compound (B2) may also be used in combination. In this case, the Tg of a copolymer of the (meth)acrylate compounds used in combination is preferably 80° C. or higher.

Furthermore, as long as the effect of the invention is not impaired, the monofunctional (meth)acrylate compound (B1) and/or the bifunctional (meth)acrylate compound (B2) as well as a trifunctional or higher (meth)acrylate compound may be used in combination if necessary. Also in this case, the Tg of a copolymer of the (meth)acrylate compounds used in combination is preferably 80° C. or higher.

Examples of the trifunctional or higher (meth)acrylate compound include: trifunctional (meth)acrylates such as EO-modified glycerol acrylate, PO-modified glycerol triacrylate, pentaerythritol triacrylate, EO-modified phosphate triacrylate, trimethylolpropane triacrylate, caprolactone-modified trimethylolpropane triacrylate, HPA-modified trimethylolpropane triacrylate, (EO) or (PO)-modified trimethylolpropane triacrylate, alkyl-modified dipentaerythritol triacrylate, and tris(acryloxyethyl)isocyanurate;

tetrafunctional (meth)acrylates such as ditrimethylolpropane tetraacrylate, pentaerythritol ethoxytetraacrylate, and pentaerythritol tetraacrylate;

penta-functional (meth)acrylates such as dipentaerythritol hydroxypentaacrylate and alkyl-modified dipentaerythritol pentaacrylate;

and hexafunctional (meth)acrylates such as dipentaerythritol hexaacrylate. These trifunctional or higher (meth)acrylates may be used alone or in combination of two or more kinds thereof.

The curable resin composition of the invention further contains a photopolymerization initiator. Examples of the photopolymerization initiator include 1-hydroxycyclohexylphenyl ketone, 2-hydroxy-2-methyl-1-phenylpropane-1-one, 1-[4-(2-hydroxyethoxy)phenyl]-2-hydroxy-2-methyl-1-propane-1-one, thioxanthone and thioxanthone derivatives, 2,2'-dimethoxy-1,2-diphenylethane-1-one, diphenyl(2,4,6-trimethoxybenzoyl)phosphine oxide, 2,4,6-trimethylbenzoyldiphenylphosphine oxide, bis(2,4,6-trimethylbenzoyl)phenylphosphine oxide, 2-methyl-1-(4-methylthiophenyl)-2-morpholinopropane-1-one, 2-benzyl-2-dimethylamino-1-(4-morpholinophenyl)-1-butanone, phenyl(2,4,6-trimethylbenzoyl)ethyl phosphinate, polymeric TPO-L, and the like.

Examples of commercially available products of photopolymerization initiators include "Omnirad-1173", "Omnirad-184", "Omnirad-127", "Omnirad-2959". "Omnirad-369", "Omnirad-379", "Omnirad-907", "Omnirad-4265", "Omnirad-1000", "Omnirad-651", "Omnirad-TPO", "Omnirad-819", "Omnirad-2022", "Omnirad-2100", "Omnirad-754", "Omnirad-784", "Omnirad-500", "Omnirad-81", "Omnirad TPO-L", "Omnipol TP" (manufactured by IGM), "Kayacure-DETX", "Kayacure-MBP", "Kayacure-DMBI", "Kayacure-EPA", "Kayacure-OA" (manufactured by Nippon Kayaku Co., Ltd.), "Bicure-10", "Bicure-55" (manufactured by Stauffer Chemical Co., Ltd.), "Trigonal P1" (manufactured by Akzo Nobel N.V.), "Sandoray 1000" (manufactured by Sandoz K.K.), "Deep" (manufactured by Upjohn), "Quantacure-PDO", "Quantacure-ITX", "Quantacure-EPD" (manufactured by Ward Blenkinsop), "Runtecure-1104" (manufactured by Runtec), and the like.

The amount of the photopolymerization initiator added is preferably in a range of 1% by mass to 20% by mass in the curable resin composition, for example.

Further, the curable resin composition may also be further improved in curability by adding a photosensitizer, if necessary.

Examples of the photosensitizer include amine compounds such as aliphatic amines and aromatic amines, urea compounds such as o-tolylthiourea, and sulfur compounds such as sodium diethyldithiophosphate and s-benzylisothiuronium-p-toluenesulfonate.

Further, the curable resin composition of the invention may also contain, if necessary, various additives such as an ultraviolet absorber, an antioxidant, a polymerization inhibitor, a silicon-based additive, a fluorine-based additive, a silane coupling agent, a phosphoric acid ester compound, organic beads, inorganic fine particles, an organic filler, an inorganic filler, a rheology control agent, a defoaming agent, and a colorant.

Examples of the ultraviolet absorber include triazine derivatives such as 2-[4-{(2-hydroxy-3-dodecyloxypropyl)oxy}-2-hydroxyphenyl]-4,6-bis(2,4-dimethylphenyl)-1,3,5-triazine and 2-[4-{(2-hydroxy-3-tridecyloxypropyl)oxy}-2-hydroxyphenyl]-4,6-bis(2,4-dimethylphenyl)-1,3,5-triazine, 2-(2'-xanthenecarboxy-5'-methylphenyebenzotriazole, 2-(2'-o-nitrobenzyloxy-5'-methylphenyl)benzotriazole, 2-xanthenecarboxy-4-dodecyloxybenzophenone, and 2-o-nitrobenzyloxy-4-dodecyloxybenzophenone. These ultraviolet absorbers may be used alone or in combination of two or more kinds thereof.

Examples of the antioxidant include a hindered phenol-based antioxidant, a hindered amine-based antioxidant, an organic sulfur-based antioxidant, a phosphoric acid ester-based antioxidant, and the like. These antioxidants may be used alone or in combination of two or more kinds thereof.

Examples of the polymerization inhibitor include hydroquinone, methoquinone, di-t-butylhydroquinone, p-methoxyphenol, butylhydroxytoluene, nitrosamine salt, and the like.

Examples of the silicon-based additive include polyorganosiloxane containing an alkyl or phenyl group, polydimethylsiloxane containing a polyether-modified acrylic group, and polydimethylsiloxane containing a polyester-modified acrylic group, such as dimethylpolysiloxane, methylphenylpolysiloxane, cyclic dimethylpolysiloxane, methylhydrogenpolysiloxane, a polyether-modified dimethylpolysiloxane copolymer, a polyester-modified dimethylpolysiloxane copolymer, a fluorine-modified dimethylpolysiloxane copolymer, and an amino-modified dimethylpolysiloxane copolymer. These silicon-based additives may be used alone or in combination of two or more kinds thereof.

Examples of the fluorine-based additive include the "Megaface" series manufactured by DIC Corporation. These fluorine-based additives may be used alone or in combination of two or more kinds thereof.

Examples of the silane coupling agent include: vinyl-based silane coupling agents such as vinyl trichlorosilane, vinyl trimethoxysilane, vinyl triethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene) propylamine, N-phenyl-3-aminopropyltrimethoxysilane, hydrochloride of N-(vinylbenzyl)-2-aminoethyl-3-aminopropyltrimethoxysilane, special aminosilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl) tetrasulfide, 3-isocyanatepropyltriethoxysilane, allyltrichlorosilane, allyltriethoxysilane, allyltrimethoxysilane, diethoxymethylvinylsilane, and vinyltris(2-methoxyethoxy)silane;

epoxy-based silane coupling agents such as diethoxy (glycidyloxypropyl)methylsilane, 2-(3,4-epoxycyclohexyl)ethyltrimethoxysilane, 3-glycidoxypropyltrimethoxysilane, 3-glycidoxypropylmethyldiethoxysilane, and 3-glycidoxypropyltriethoxysilane;

styrene-based silane coupling agents such as p-styryltrimethoxysilane;

(meth)acryloxy-based silane coupling agents such as 3-methacryloxypropylmethyldimethoxysilane, 3-acryloxypropyltrimethoxysilane, 3-methacryloxypropyltrimethoxysilane, 3-methacryloxypropylmethyldiethoxysilane, and 3-methacryloxypropyltriethoxysilane;

amino-based silane coupling agents such as N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane;

ureido-based silane coupling agent such as 3-ureidopropyltriethoxysilane;

chloropropyl-based silane coupling agent such as 3-chloropropyltrimethoxysilane;

mercapto-based silane coupling agents such as 3-mercaptopropylmethyldimethoxysilane and 3-mercaptopropyltrimethkinsilane;

sulfide-based silane coupling agent such as bis(triethoxysilylpropyl)tetrasulfide;

isocyanate-based silane coupling agent such as 3-isocyanate propyltriethoxysilane; and the like. These silane coupling agents may be used alone or in combination of two or more kinds thereof.

Examples of the phosphoric acid ester compound include compounds containing a (meth)acryloyl group in the molecular structure, and examples of commercially available products thereof include "Kayamer PM-2", "Kayamer PM-21" manufactured by Nippon Kayaku Co., Ltd., "LIGHT ESTER P-1M" "LIGHT ESTER P-2M", "LIGHT ACRYLATE P-1A(N)" manufactured by Kyoeisha Chemical Co., Ltd., "SIPOMER PAM 100", "SIPOMER PAM 200", "SIPOMER PAM 300", "SIPOMER PAM 4000", manufactured by SOLVAY, "Viscoat #3PA", "Viscoat #3PMA" manufactured by Osaka Organic Chemical Industry Ltd., and "NEW FRONTIER S-23A" manufactured by DKS Co. Ltd.; and "SIPOMER PAM 5000" manufactured by SOLVAY, which is a phosphoric acid ester compound including an allyl ether group in the molecular structure.

Examples of the organic beads include polymethylmethacrylate beads, polycarbonate beads, polystyrene beads, polyacrylic styrene beads, silicone beads, glass beads, acrylic beads, benzoguanamine resin beads, melamine resin beads, polyolefin resin beads, polyester resin beads, polyamide resin beads, polyimide resin beads, polyfluoroethylene resin beads, polyethylene resin beads, and the like. These organic beads may be used alone or in combination of two or more kinds thereof. Further, the average particle size of these organic beads is preferably in a range of 1 µm to 10 µm.

Examples of the inorganic fine particles include fine particles such as silica, alumina, zirconia, titania, barium titanate, and antimony trioxide. These inorganic fine particles may be used alone or in combination of two or more kinds thereof. Further, the average particle size of these inorganic fine particles is preferably in a range of 95 nm to 250 nm, and more preferably in a range of 100 nm to 180 nm.

When the inorganic fine particles are contained, a dispersion aid may be used. Examples of the dispersion aid include phosphoric acid ester compounds such as isopropyl acid phosphate, triisodecyl phosphite, and ethylene oxide-modified phosphoric acid dimethacrylate. These dispersion aids may be used alone or in combination of two or more kinds thereof. Further, examples of commercially available products of the dispersion aid include the "Kayamer PM-21", "Kayamer PM-2" manufactured by Nippon Kayaku Co., Ltd., the "LIGHT ESTER P-2M" manufactured by Kyoeisha Chemical Co., Ltd., and the like.

Examples of the organic filler include plant-derived solvent-insoluble substances such as cellulose, lignin, and cellulose nanofibers.

Examples of the inorganic filler include glass (particles), silica (particles), alumina silicate, talc, mica, aluminum hydroxide, alumina, calcium carbonate, carbon nanotubes, and the like.

Examples of the rheology control agent include: amide waxes such as "DISPARLON 6900" manufactured by Kusumoto Chemicals, Ltd.; urea-based rheology control agents such as "BYK410" manufactured by BYK-Chemie; polyethylene waxes such as "DISPARLON 4200" manufactured by Kusumoto Chemicals, Ltd.; and cellulose acetate butyrate such as "CAB-381-2" and "CAB 32101" manufactured by Eastman Chemical Company.

Examples of the defoaming agent include an oligomer containing a fluorine atom or a silicon atom, an oligomer such as a higher fatty acid and an acrylic polymer, and the like.

Examples of the colorant include pigments, dyes, and the like.

As the pigment, known and commonly used inorganic pigments or organic pigments can be used.

Examples of the inorganic pigments include titanium oxide, antimony red, red iron oxide, cadmium red, cadmium yellow, cobalt blue, prussian blue, ultramarine, carbon black, graphite, and the like.

Examples of the organic pigments include quinacridone pigments, quinacridone quinone pigments, dioxazine pigments, phthalocyanine pigments, anthrapyrimidine pigments, anthanthrone pigments, indanthrone pigments, flavanthron pigments, perylene pigments, diketopyrrolopyrrole pigments, perinone pigments, quinophthalone pigments, anthraquinone pigments, thioindigo pigments, benzimidazolone pigments, azo pigments, and the like. These pigments may be used alone or in combination of two or more kinds thereof.

Examples of the dye include azo dyes such as monoazo and disazo, metal complex salt dyes, naphthol dyes, anthraquinone dyes, indigo dyes, carbonium dyes, kinoimin dyes, cyanine dyes, quinoline dyes, nitro dyes, nitroso dyes, benzoquinone dyes, naphthoquinone dyes, naphthalimide dyes, perinone dyes, phthalocyanine dyes, triallyl methane dyes, and the like. These dyes may be used alone or in combination of two or more kinds thereof.

The cured product of the invention can be obtained by irradiating the curable resin composition with active energy rays. Examples of the active energy rays include ionizing radiation rays such as ultraviolet rays, electron beams, α rays, β rays, and γ rays. Further, in a case where the ultraviolet rays are used as the active energy rays, the curable resin composition may be irradiated in an atmosphere of an inert gas such as a nitrogen gas or in an air atmosphere in order to efficiently carry out the curing reaction using the ultraviolet rays.

As an ultraviolet ray generation source, an ultraviolet lamp is generally used from the viewpoint of practicality and economy. Specific examples thereof include low-pressure mercury lamps, high-pressure mercury lamps, ultra-high-pressure mercury lamps, xenon lamps, gallium lamps, metal halide lamps, sunlight, LEDs, and the like.

The integrated light intensity of the active energy rays is not particularly limited, but is preferably 50 mJ/cm$^2$ to 5,000 mJ/cm$^2$, and more preferably 300 mJ/cm$^2$ to 1,000 mJ/cm$^2$. The integrated light intensity in the above range is preferable because the generation of uncured portions can be prevented or reduced.

The three-dimensional object of the invention can be produced by a known three-dimensional optical modeling method.

Examples of the three-dimensional optical modeling method include a stereolithography (SLA) method, a digital light processing (DLP) method, and an inkjet stereolithography method.

The stereolithography (SLA) method is a method in which a tank containing a liquid curable resin composition is spot-irradiated with an active energy ray such as a laser beam, and the liquid curable resin composition is cured layer by layer while moving a modeling stage to perform the three-dimensional modeling.

The digital light processing (DLP) method is a method in which a tank containing a liquid curable resin composition is surface-irradiated with an active energy ray such as an LED, and the liquid curable resin composition is cured layer by layer while moving the modeling stage to perform the three-dimensional modeling.

The inkjet stereolithography method is a method in which minute droplets of a curable resin composition for stereolithography are ejected from a nozzle for drawing a pattern with a predetermined shape, and then the pattern is irradiated with ultraviolet rays to form a cured thin film.

Among these three-dimensional optical modeling methods, the DLP method is preferable because it is possible to implement high-speed modeling using the surface-irradiation.

A three-dimensional modeling method that is the DLP method is not particularly limited as long as it is a method using a stereolithography system of the DLP method. However, regarding the modeling conditions, in order to improve the modeling accuracy of the three-dimensional object, it is required that the lamination pitch of the stereolithography is in a range of 0.01 mm to 0.2 mm, the radiation wavelength is in a range of 350 nm to 410 nm, the light intensity is in a range of 0.5 mW/cm$^2$ to 50 mW/cm$^2$, and the integrated light intensity per layer is in a range of 1 mJ/cm$^2$ to 100 mJ/cm$^2$, and among these, in order to further improve the modeling accuracy of the three-dimensional object, it is preferable that the lamination pitch of the stereolithography is in a range of 0.02 mm to 0.1 mm, the radiation wavelength is in a range of 380 nm to 410 nm, the light intensity is in a range of 5 mW/cm$^2$ to 15 mW/cm$^2$, and the integrated light intensity per layer is in a range of 5 mJ/cm$^2$ to 15 mJ/cm$^2$.

The three-dimensional object of the invention has high elastic modulus and excellent impact resistance, and therefore can be preferably used for, for example, automobile parts, aerospace-related parts, electrical and electronic parts, home appliances, building materials, interiors, jewelry, medical materials, and the like.

EXAMPLES

Hereinafter, the invention will be specifically described with reference to Examples and Comparative Examples.

Further, in this Example, the number average molecular weight (Mn) and the weight average molecular weight (Mw) are values measured under the following conditions using the gel permeation chromatography (GPC).

Measuring device: HLC-8220 manufactured by Tosoh Corporation

Column: Guard column $H_{XL}$-H manufactured by Tosoh Corporation

+TSKgel G5000HXL manufactured by Tosoh Corporation

+TSKgel G4000HXL manufactured by Tosoh Corporation

+TSKgel G3000HXL manufactured by Tosoh Corporation

+TSKgel G2000HXL manufactured by Tosoh Corporation

Detector: Refractive index detector (RI)

Data processing: SC-8010 manufactured by Tosoh Corporation

Measurement conditions: column temperature: 40° C.

solvent: Tetrahydrofuran flow velocity: 1.0 ml/min

Standard: polystyrene

Sample: a product obtained by filtering, with a microfilter, 0.4% by mass of a tetrahydrofuran solution in terms of resin solid content (100 μl)

Synthesis Example 1

Synthesis of Polyester Polyol (1)

Into a reaction vessel equipped with a stirrer, a condenser, and a thermometer, 448 parts by mass of 3-methyl-1,5-pentanediol and 352 parts by mass of adipic acid were put. A reaction was allowed to proceed at 200° C. to 250° C. for 18 hours while stirring the mixture under a nitrogen stream, thereby obtaining a polyester polyol (1). Regarding the polyester polyol (1), the number average molecular weight (Mn) was 500, the weight average molecular weight (Mw) was 1,100, the acid value was 2.4 mg KOH/g, and the hydroxyl value was 220 mg KOH/g. The hydroxyl value and the acid value are values measured based on a neutralization titration method of JIS K 0070 (1992).

Synthesis Example 2: Synthesis of Polyester Polyol (2)

Into a reaction vessel equipped with a stirrer, a condenser, and a thermometer, 378 parts by mass of 3-methyl-1,5-pentanediol and 422 parts by mass of adipic acid were put. A reaction was allowed to proceed at 200° C. to 250° C. for 18 hours while stirring the mixture under a nitrogen stream, thereby obtaining a polyester polyol (2). Regarding the polyester polyol (2), the number average molecular weight (Mn) was 2,100, the weight average molecular weight (Mw) was 3,800, the acid value was 3.0 mg KOH/g, and the hydroxyl value was 56 mg KOH/g.

Synthesis Example 3: Synthesis of Polyester Polyol (3)

Into a reaction vessel equipped with a stirrer, a condenser, and a thermometer, 359 parts by mass of 3-methyl-1,5-pentanediol and 441 parts by mass of adipic acid were put. A reaction was allowed to proceed at 200° C. to 250° C. for 18 hours while stirring the mixture under a nitrogen stream, thereby obtaining a polyester polyol (3). Regarding the polyester polyol (3), the number average molecular weight (Mn) was 9,800, the weight average molecular weight (Mw) was 19,400, the acid value was 3.2 mg KOH/g, and the hydroxyl value was 9 mg KOH/g.

Synthesis Example 4: Synthesis of Polyester Polyol (4)

Into a reaction vessel equipped with a stirrer, a condenser, and a thermometer, 353 parts by mass of neopentyl glycol and 450 parts by mass of adipic acid were put. A reaction was allowed to proceed at 200° C. to 250° C. for 18 hours while stirring the mixture under a nitrogen stream, thereby obtaining a polyester polyol (4). Regarding the polyester polyol (4), the number average molecular weight (Mn) was 2,000, the weight average molecular weight (Mw) was 4,200, the acid value was 3.0 mg KOH/g, and the hydroxyl value was 53 mg KOH/g.

Synthesis Example 5: Synthesis of Polyester Polyol (5)

Into a reaction vessel equipped with a stirrer, a condenser, and a thermometer, 262 parts by mass of ethylene glycol and 571 parts by mass of adipic acid were put. A reaction was allowed to proceed at 200° C. to 250° C. for 18 hours while stirring the mixture under a nitrogen stream, thereby obtaining a polyester polyol (5). Regarding the polyester polyol (5), the number average molecular weight (Mn) was 2,300, the weight average molecular weight (Mw) was 4,800, the acid value was 2.0 mg KOH/g, and the hydroxyl value was 49 mg KOH/g.

Synthesis Example 6: Synthesis of Urethane Resin (A-1) Containing Acryloyl Group To a 1 liter flask equipped with a stirrer, a gas inlet tube, a condenser, and a thermometer, 297 parts by mass of isophorone diisocyanate, 1.6 parts by mass of tertiarybutyl-hydroxytoluene, 0.2 parts by mass of methoxyhydroquinone, and 0.2 parts by mass of dibutyltin diacetate were added, the temperature was raised to 70° C., and 347 parts by mass of the polyester polyol (1) obtained in Synthesis Example 1 was added dropwise over 1 hour. After the dropwise addition, a reaction was allowed to proceed at 70° C. for 3 hours, and then, 155 parts by mass of hydroxyethyl acrylate was added dropwise over 1 hour. After the dropwise addition, a reaction was carried out at 70° C. until an infrared absorption spectrum of 2,250 cm$^{-1}$ showing an isocyanate group disappeared, thereby obtaining a urethane resin (A-1) containing an acryloyl group.

Synthesis Example 7: Synthesis of Urethane Resin (A-2) Containing Acryloyl Group To a 1 liter flask equipped with a stirrer, a gas inlet tube, a condenser, and a thermometer, 131 parts by mass of isophorone diisocyanate, 1.6 parts by mass of tertiarybutyl-hydroxytoluene, 0.2 parts by mass of methoxyhydroquinone, and 0.2 parts by mass of dibutyltin diacetate were added, the temperature was raised to 70° C., and 600 parts by mass of the polyester polyol (2) obtained in Synthesis Example 2 was added dropwise over 1 hour. After the dropwise addition, a reaction was allowed to proceed at 70° C. for 3 hours, and then, 68 parts by mass of hydroxyethyl acrylate was added dropwise over 1 hour. After the dropwise addition, a reaction was carried out at 70° C. until an infrared absorption spectrum of 2,250 cm$^{-1}$ showing an isocyanate group disappeared, thereby obtaining a urethane resin (A-2) containing an acryloyl group.

Synthesis Example 8: Synthesis of Urethane Resin (A-3) Containing Acryloyl Group To a 1 liter flask equipped with a stirrer, a gas inlet tube, a condenser, and a thermometer, 27 parts by mass of isophorone diisocyanate, 1.6 parts by mass of tertiarybutyl-hydroxytoluene, 0.2 parts by mass of methoxyhydroquinone, and 0.2 parts by mass of dibutyltin diacetate were added, the temperature was raised to 70° C., and 760 parts by mass of the polyester polyol (3) obtained in Synthesis Example 3 was added dropwise over 1 hour. After the dropwise addition, a reaction was allowed to proceed at 70° C. for 3 hours, and then, 14 parts by mass of hydroxyethyl acrylate was added dropwise over 1 hour. After the dropwise addition, a reaction was carried out at 70° C. until an infrared absorption spectrum of 2250 cm$^{-1}$ showing an isocyanate group disappeared, thereby obtaining a urethane resin (A-3) containing an acryloyl group.

Synthesis Example 9: Synthesis of Urethane Resin (A-4) Containing Acryloyl Group To a 1 liter flask equipped with a stirrer, a gas inlet tube, a condenser, and a thermometer, 125 parts by mass of isophorone diisocyanate, 1.6 parts by mass of tertiarybutyl-hydroxytoluene, 0.2 parts by mass of methoxyhydroquinone, and 0.2 parts by mass of dibutyltin diacetate were added, the temperature was raised to 70° C., and 609 parts by mass of the polyester polyol (4) obtained in Synthesis Example 4 was added dropwise over 1 hour. After the dropwise addition, a reaction was allowed to proceed at 70° C. for 3 hours, and then, 65 parts by mass of hydroxyethyl acrylate was added dropwise over 1 hour. After the dropwise addition, a reaction was carried out at 70° C. until an infrared absorption spectrum of 2250 cm$^{-1}$ showing an isocyanate group disappeared, thereby obtaining a urethane resin (A-4) containing an acryloyl group.

Synthesis Example 10: Synthesis of Urethane Resin (A-5) Containing Acryloyl Group To a 1 liter flask equipped with a stirrer, a gas inlet tube, a condenser, and a thermometer, 118 parts by mass of isophorone diisocyanate, 1.6 parts by mass of tertiarybutyl-hydroxytoluene, 0.2 parts by mass of methoxyhydroquinone, and 0.2 parts by mass of dibutyltin diacetate were added, the temperature was raised to 70° C., and 620 parts by mass of the polyester polyol (5) obtained in Synthesis Example 5 was added dropwise over 1 hour. After the dropwise addition, a reaction was allowed to proceed at 70° C. for 3 hours, and then, 62 parts by mass of hydroxyethyl acrylate was added dropwise over 1 hour. After the dropwise addition, a reaction was carried out at 70° C. until an infrared absorption spectrum of 2250 cm$^{-1}$ showing an isocyanate group disappeared, thereby obtaining a urethane resin (A-5) containing an acryloyl group.

Example 1: Preparation of Curable Resin Composition (1)

Into a four-necked flask equipped with a stirrer, a thermometer, and a condenser, 30 parts by mass of the urethane resin (A-1) containing an acryloyl group obtained in Synthesis Example 6 and 70 parts by mass of acryloyl morpholine ("ACMO" manufactured by KJ Chemicals Corporation) were charged, and then, the mixture was stirred at 60° C. or lower until the urethane resin (A-1) is dissolved uniformly, thereby obtaining a curable resin composition (1).

Examples 2 to 9: Preparation of Curable Resin Compositions (2) to (9)

Curable resin compositions (2) to (9) were obtained in the same manner as in Example 1 except that the urethane resin containing an acryloyl group and the (meth)acrylate compound were changed to have compositions and blending amounts shown in Table 1.

Comparative Examples 1 to 3: Preparation of Curable Resin Compositions (C1) to (C3)

Curable resin compositions (C1) to (C3) were obtained in the same manner as in Example 1 except that the urethane resin containing an acryloyl group and the (meth)acrylate compound used in Example 1 were changed to have the compositions and blending amounts shown in Table 1.

The following evaluations were carried out using the curable resin compositions obtained in Examples 1 to 9 and Comparative Examples 1 to 3 described above.

[Measurement of Viscosity]

By using an E-type viscometer ("TV-22" manufactured by Toki Sangyo Co., Ltd.), the viscosity of the curable resin composition obtained in each Example and Comparative Example was measured at 25° C.

[Preparation of Test Piece]

By using a stereolithography 3D printer ("ACCULAS BA-30S" manufactured by D-MEC Ltd.), a dumbbell for a tensile test (ASTM D638 TYPE1 compliant) and a test piece for an Izod impact test (ASTM D256 compliant) were prepared. Next, the dumbbell for the tensile test and the test piece for the Izod impact test obtained by stereolithography were washed with isopropyl alcohol, followed by drying at room temperature for 1 hour, and then, as post-curing, both sides of each test piece were irradiated with UV (10,000 mJ/cm$^2$ for each surface) by a high-pressure mercury lamp, thereby obtaining a test piece 1 (dumbbell for a tensile test) and a test piece 2 (test piece for an Izod impact test).

[Measurement Method for Elastic Modulus and Elongation]

In accordance with ASTM D638, the elastic modulus and the elongation of the test piece 1 were measured by being subjected to a tensile test using an autograph "AG-Xplus 100 kN" manufactured by Shimadzu Corporation (load cell 100 kN, head speed 5 mm/min, test piece width 10 mm).

[Method for Measuring Izod Impact Strength (Impact Resistance)]

In accordance with ASTM D256, the Izod impact strength of the test piece 2 was measured with a "Universal Impact Tester" manufactured by Toyo Seiki Seisaku-sho Co., Ltd.

Table 1 shows the compositions and evaluation results of the curable resin compositions obtained in Examples 1 to 9 and Comparative Examples 1 to 3.

TABLE 1

| Curable resin composition | | Example 1 (1) | Example 2 (2) | Example 3 (3) | Example 4 (4) | Example 5 (5) | Example 6 (6) | Example 7 (7) | Example 8 (8) | Example 9 (9) | Comparative Example 1 (C1) | Comparative Example 2 (C2) | Comparative Example 3 (C3) |
|---|---|---|---|---|---|---|---|---|---|---|---|---|---|
| Urethane resin (A-1) containing acryloyl group | Composition (part by mass) | 30 | | | | | | | | | | | |
| Urethane resin (A-2) containing acryloyl group | | | 2 | 15 | 30 | 45 | 30 | 60 | | | | | |
| Urethane resin (A-3) containing acryloyl group | | | | | | | | | 10 | | | | |
| Urethane resin (A-4) containing acryloyl group | | | | | | | | | | 30 | | | 30 |
| Urethane resin (A-5) containing acryloyl group | | | | | | | | | | | 30 | 30 | |
| Acryloyl morpholine | | 70 | | | | | 40 | | | | | | |
| Isobornyl acrylate | | | 98 | | | 30 | | | | | | 40 | |
| Dicyclopentanyl acrylate | | | | 85 | | | 50 | | 90 | 70 | 70 | | |
| Phenoxyethyl acrylate | | | | | 70 | | | | | | | | |
| Tricyclodecane dimethanol diacrylate | | | | | | 25 | | | | | | 30 | |
| EO-modified diacrylate of bisphenol A | | | | | | | 20 | | | | | | |
| Dipentaerythritol hexaacrylate | | | | | | | | | | | | | 70 |
| Viscosity [mPa · s] | | 300 | 100 | 140 | 500 | 800 | 400 | 1,800 | 1,300 | 1,600 | 2,500 | 2,800 | 15,000 |
| Elastic modulus [MPa] | | 2,800 | 3,200 | 3,500 | 1,000 | 3,200 | 3,500 | 2,500 | 3,000 | 3,200 | 4,100 | 4,500 | 5,000 |
| Izod impact strength [J/m] | | 100 | 120 | 150 | 50 | 100 | 130 | 180 | 90 | 80 | 40 | 30 | 10 |

The invention claimed is:

1. A curable resin composition, comprising:
   a urethane resin (A) containing a (meth)acryloyl group,
   a monofunctional (meth)acrylate compound (B1), and
   a bifunctional (meth)acrylate compound (B2), wherein
   the urethane resin (A) is formed using, as essential reaction raw materials, a polyester polyol (a1), a polyisocyanate (a2), and a compound (a3) containing a hydroxyl group and a (meth)acryloyl group,
   the polyester polyol (a1) is formed using, as essential reaction raw materials, a glycol (a1-1) containing a hydrocarbon group in a side chain, and a polycarboxylic acid (a1-2), and
   when the monofunctional (meth)acrylate compound (B1) and the bifunctional (meth)acrylate compound (B2) form a copolymer, the copolymer has a glass transition temperature of 80° C. or higher.

2. The curable resin composition according to claim 1, wherein the glycol (a1-1) contains 3-methyl pentanediol.

3. The curable resin composition according to claim 1, wherein the urethane resin (A) has a content in a range of 3% by mass to 50% by mass in a solid content of the curable resin composition.

4. The curable resin composition according to claim 1, wherein the polyester polyol (a1) has a number average molecular weight in a range of 1,000 to 10,000.

5. The curable resin composition according to claim 1, wherein the monofunctional (meth)acrylate compound (B1) is one or more compounds selected from the group consisting of (meth)acryloyl morpholine, isobornyl (meth)acrylate, dicyclopentenyl (meth)acrylate, and dicyclopentanyl (meth)acrylate.

6. A cured product, which is a curing reaction product of the curable resin composition according to claim 1.

7. The cured product according to claim 6, wherein irradiation with an active energy ray is a curing condition.

8. A three-dimensional object comprising the cured product according to claim 6.

9. A three-dimensional object comprising the cured product according to claim 7.

* * * * *